US012734680B2

(12) United States Patent
Zhang et al.

(10) Patent No.: US 12,734,680 B2
(45) Date of Patent: Sep. 15, 2026

(54) FINGER JOINT TRANSMISSION MECHANISM OF ANTHROPOMORPHIC ROBOT HAND

(71) Applicants: Yisi Zhang, Bundoora (AU); Eric Huwald, Bundoora (AU)

(72) Inventors: Yisi Zhang, Bundoora (AU); Eric Huwald, Bundoora (AU)

( * ) Notice: Subject to any disclaimer, the term of this patent is extended or adjusted under 35 U.S.C. 154(b) by 491 days.

(21) Appl. No.: 18/534,946

(22) Filed: Dec. 11, 2023

(65) Prior Publication Data

US 2024/0189984 A1 Jun. 13, 2024

(30) Foreign Application Priority Data

Dec. 13, 2022 (TW) ................................. 111147861

(51) Int. Cl.
*B25J 9/10* (2006.01)
*B25J 15/00* (2006.01)
*B25J 17/00* (2006.01)

(52) U.S. Cl.
CPC ........... *B25J 9/102* (2013.01); *B25J 15/0009* (2013.01); *B25J 17/00* (2013.01)

(58) Field of Classification Search
CPC .... B25J 9/102; B25J 15/0009; B25J 15/0213; B25J 17/00
USPC .......................................................... 294/192
See application file for complete search history.

(56) References Cited

U.S. PATENT DOCUMENTS 4,114,464 A * 9/1978 Schubert .............. B25J 15/0213 901/38
4,623,183 A * 11/1986 Aomori .................. B25J 15/103 294/106
6,361,570 B1 * 3/2002 Gow ......................... A61F 2/58 901/29
8,997,599 B2 * 4/2015 Maisonnier .......... B25J 17/0275 74/490.06
12,420,434 B1 * 9/2025 Goldsmith ........... B25J 15/0009
2010/0005918 A1 * 1/2010 Mizuno ................ B25J 15/0009 74/425
2012/0068486 A1 * 3/2012 Kim ......................... B25J 15/10 294/213
2014/0197652 A1 * 7/2014 Wang ................... B25J 15/0009 294/185
2015/0151433 A1 * 6/2015 Rust ..................... B25J 15/0213 294/106
2021/0138635 A1 * 5/2021 Elder ................... B25J 15/0253
2022/0305676 A1 * 9/2022 Sun ........................ B25J 9/1085
2025/0214259 A1 * 7/2025 Goldsmith ........... B25J 15/0213

* cited by examiner

*Primary Examiner* — Paul T Chin
(74) *Attorney, Agent, or Firm* — Rosenberg, Klein & Lee

(57) ABSTRACT

A finger joint transmission mechanism of an anthropomorphic robot hand includes a first finger segment and a second finger segment that are pivotally connected to each other. A toothed rack in an arc shape is provided at the joint of the first finger segment and the second finger segment. The second finger segment has a power device and an inclined transmission unit therein. The transmission unit meshes with the toothed rack of the first finger segment. When the power unit drives the transmission unit to run, the transmission unit is driven to move along the toothed rack, so that the second finger segment is driven to be pivoted upward or downward at a predetermined angle relative to the first finger segment.

8 Claims, 8 Drawing Sheets

FINGER JOINT TRANSMISSION MECHANISM OF ANTHROPOMORPHIC ROBOT HAND

FIELD OF THE INVENTION

The present invention relates to a robot hand mechanism, and more particularly to a finger joint transmission mechanism of an anthropomorphic robot hand.

BACKGROUND OF THE INVENTION

With the booming development of robotics industry, an anthropomorphic robot hand is a structure to simulate the human hand, so it can be like the human hand to perform specific tasks. The research on multi-finger robot hands focuses on the function of dexterity.

As to the existing anthropomorphic robot hands, they are designed to grasp objects. The finger segments are pivotally connected to one another and can be driven to move in a predefined degree of freedom. Chinese Patent No. CN108189065 discloses a bionic finger device. The finger segments of the finger are pivotally connected to one another via connecting rods. A linear drive element is connected to the connecting rod of the first finger segment. When the linear drive element is actuated, the connecting rods are linked to drive each finger segment to bend or straighten relative to one another. However, although this robot hand can imitate a human hand to grasp an object, the finger segments driven by the connecting rods have little degree of freedom. Besides, the bending motion of each finger segment cannot be individually controlled and accurately positioned, so the robot hand can only carry out simple grasping work.

In addition, there are other designs that use a rope to pull the pivoted finger segments to achieve bending or straightening motions, which mainly simulates a human tendon to pull the finger joints for corresponding pivoting motions. However, the drive unit of this robot hand for rolling the rope is relatively large in size, and the ropes to drive the fingers are separately wound on the robot hand. This makes the overall assembly of this robot hand more complex, and the bending motion of each finger segment cannot be individually controlled and accurately positioned. Accordingly, the inventor of the present invention has devoted himself based on his many years of practical experiences to solve these problems.

SUMMARY OF THE INVENTION

The primary object of the present invention is to provide a finger joint transmission mechanism of an anthropomorphic robot hand, which has the effects of simplifying the structure and assembly, effectively utilizing the space to reduce the volume and ensuring the reduction ratio, and has high flexibility and precise control.

In order to achieve the foregoing object, the finger joint transmission mechanism of the anthropomorphic robot hand provided by the present invention comprises a first finger segment, a second finger segment, and a transmission unit.

The first finger segment has a first pivot portion and a first joint portion at one end thereof. A toothed rack is provided on the first joint portion. The toothed rack is arranged in an arc shape along a Y-axis.

The second finger segment is hollow and has an accommodating space therein. The second finger segment has a head end and a tail end opposite to the head end. The head portion of the second finger segment is pivotally connected to the first pivot portion of the first finger segment. The tail end has a second pivot portion and a second joint portion. A power unit is provided in the accommodating space. The power unit includes a transmission shaft extending toward the first joint portion and a transmission gear connected to a periphery of the transmission shaft.

The transmission unit is disposed at an upper position of the second finger segment close to the head end. The transmission unit includes a toothed disc meshing with the transmission gear. A drive shaft is provided at a center of the toothed disc. The drive shaft is synchronously rotated along with the toothed disc. A drive gear is provided along a periphery of the drive shaft. The drive gear meshes with the toothed rack.

When the transmission gear on the transmission shaft of the power unit drives the toothed disc and the drive shaft to rotate, the drive gear is synchronously driven to move along the toothed rack, so that the second finger segment is driven to be pivoted upward or downward at a predetermined angle relative to the first finger segment.

DETAILED DESCRIPTION OF THE PREFERRED EMBODIMENTS

Figure 1:
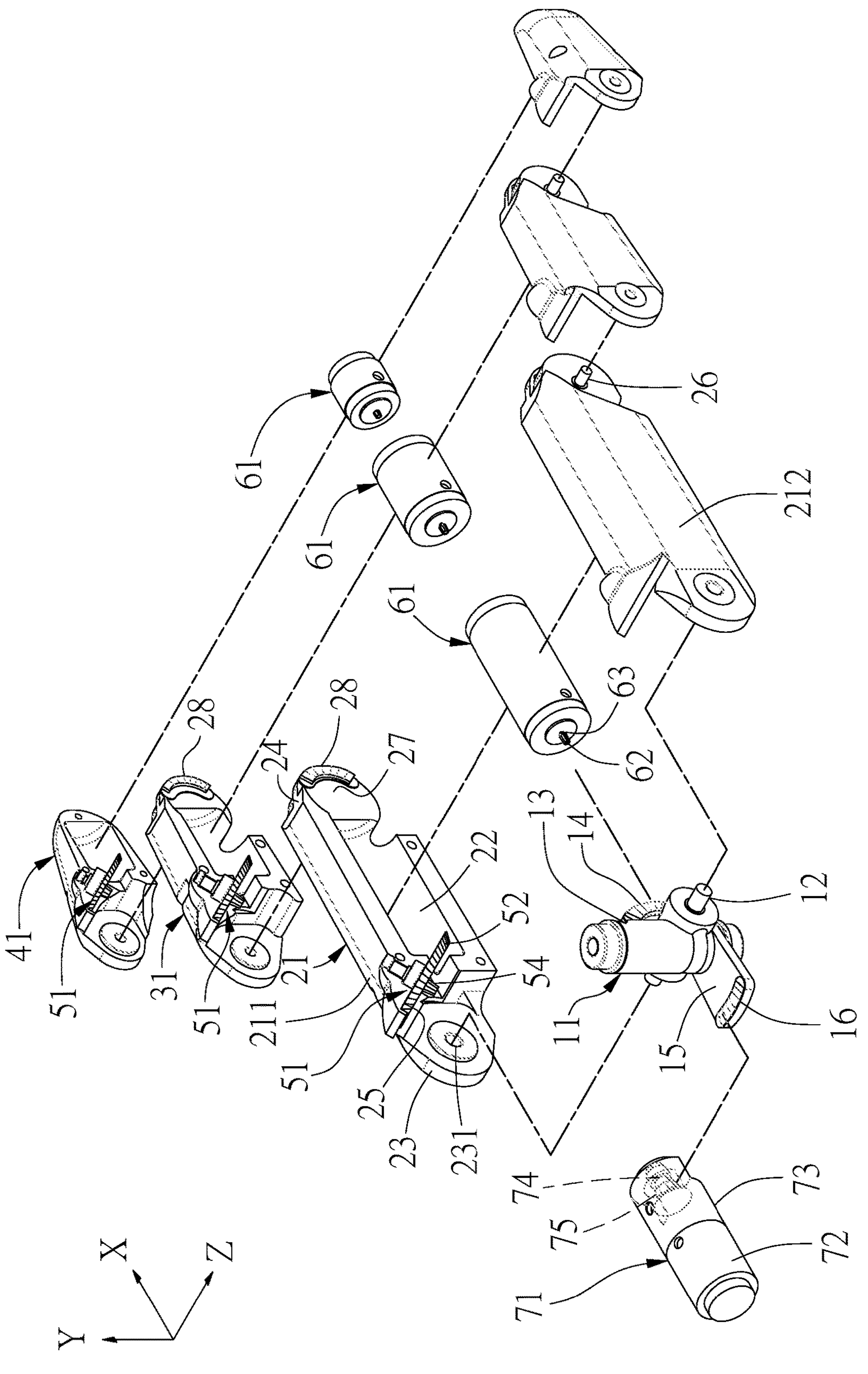
FIG. 1 is an exploded view of the present invention.
Figure 2:
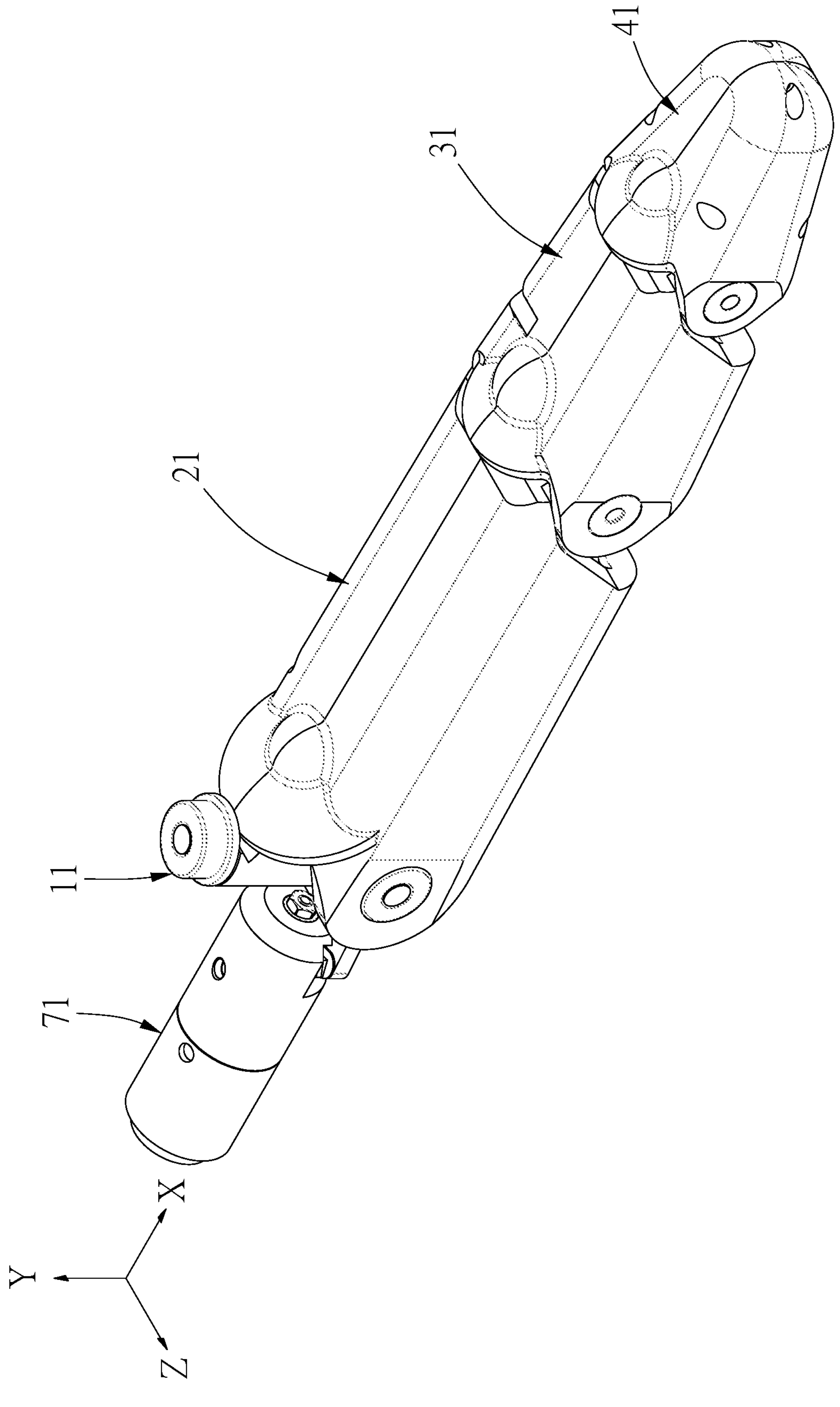
FIG. 2 is a perspective view of the present invention.
Figure 3:
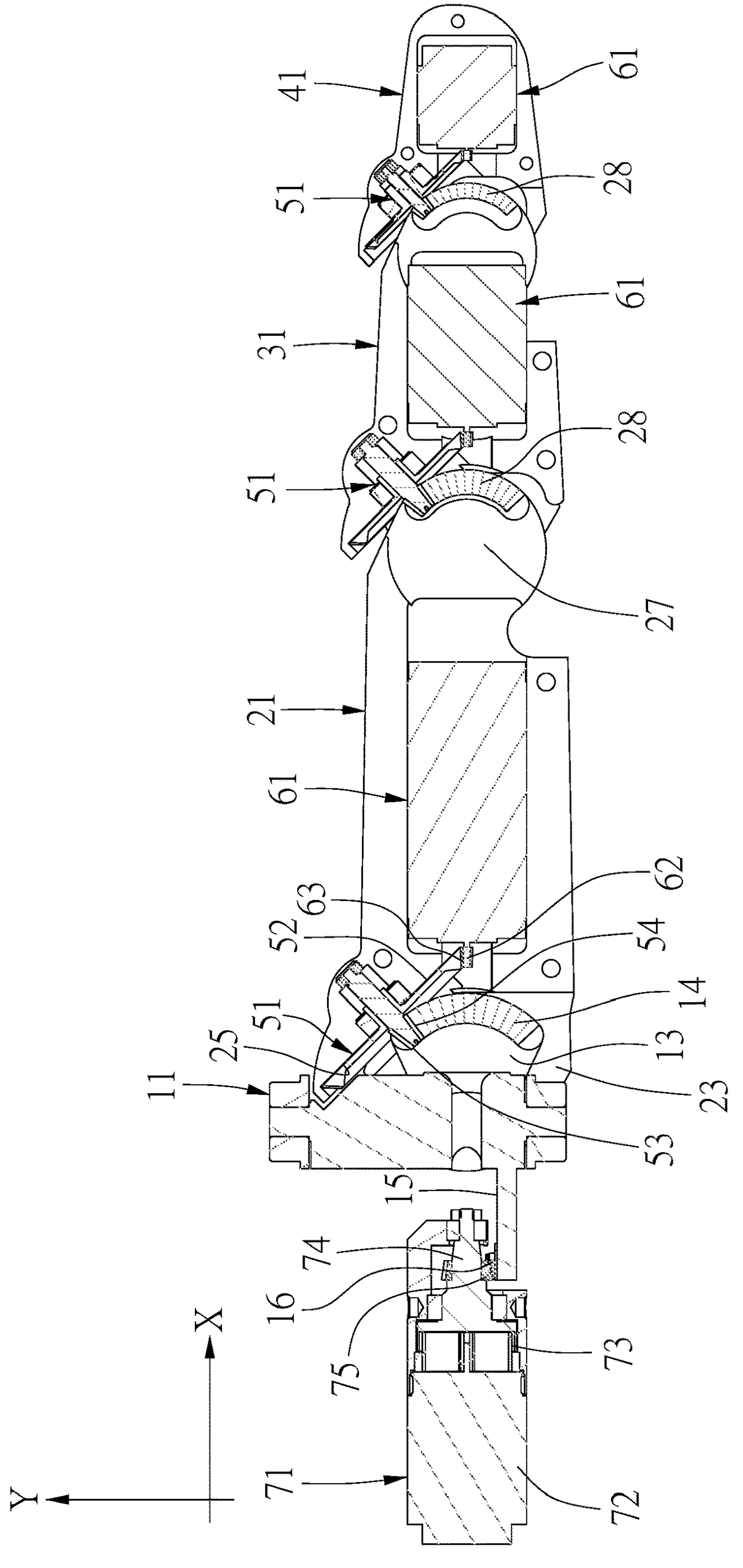
FIG. 3 is a schematic view showing the assembled structure of the present invention.
Figure 4:
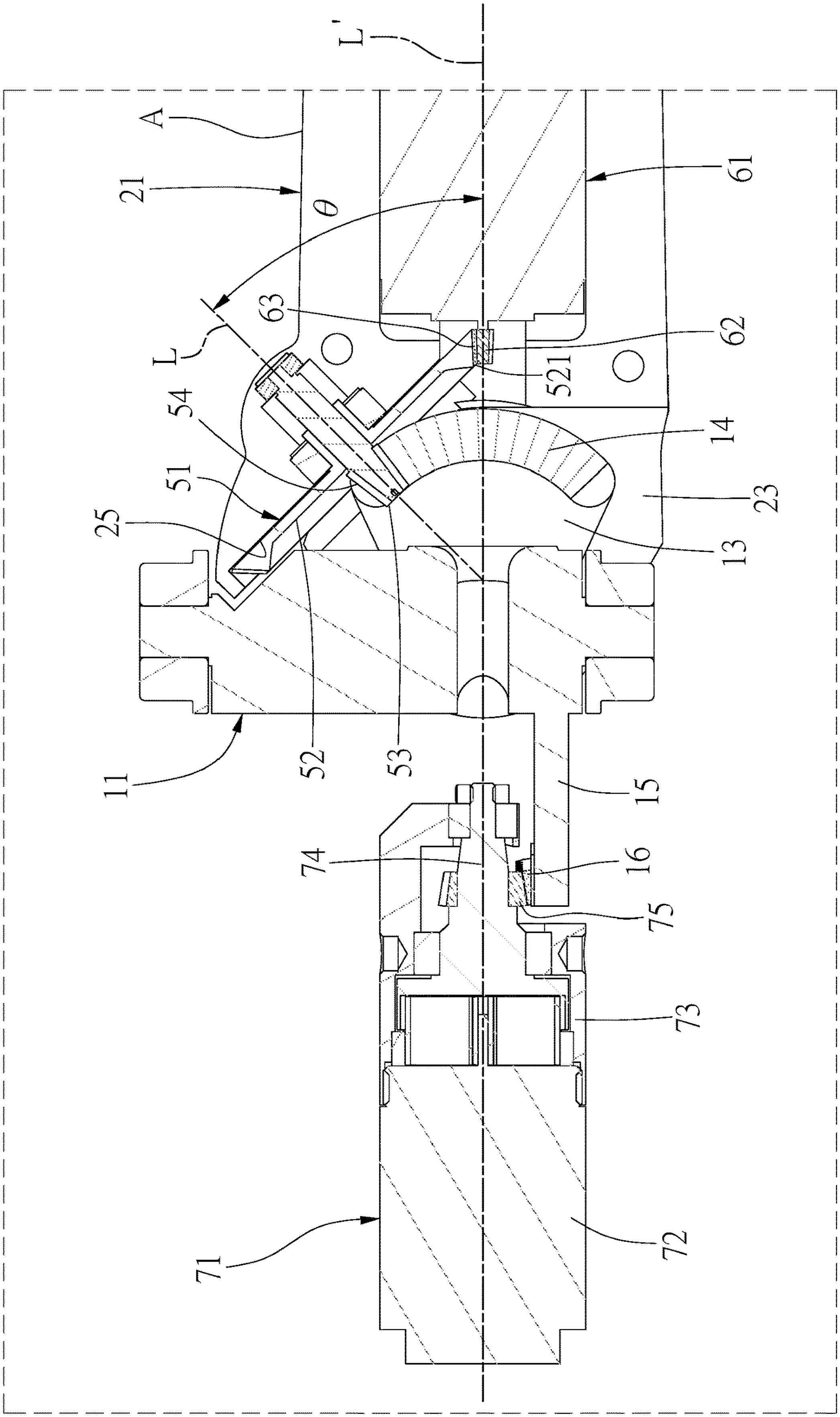
FIG. 4 is a partial enlarged view of FIG. 3.

Referring to FIG. 1 through FIG. 4, a finger joint transmission mechanism of an anthropomorphic robot hand provided by the present invention comprises a first finger segment 11, a second finger segment 21, a third finger segment 31 and a fourth finger segment 41 that are pivotally connected to one another in sequence. A transmission unit 51 is provided at a joint of every two of the first finger segment 11, the second finger segment 21, the third finger segment 31 and the fourth finger segment 41.

One end of the first finger segment 11 has a first pivot portion 12 in the form of a protruding post extending laterally along a Z-axis and a first joint portion 13 in the form of a plate protruding forward along an X-axis. A toothed rack 14 is provided on the first joint portion 13. The toothed rack 14 is arranged in an arc shape along a Y-axis.

The second finger segment 21 is hollow and has an accommodating space 22 therein. The accommodating space 22 extends along the direction of the long axis of the second finger segment 21. In this embodiment, the second finger segment 21 is composed of a first half shell 211 and a second half shell 212 that are assembled together. In other feasible embodiments, the second finger segment 21 may be composed of a hollow cylinder having at least one open end or a truss-type support frame. The present invention is not limited to the structure or manufacturing method of the finger segment itself. The second finger segment 21 has a head end 23 and a tail end 24 opposite to the head end 23. The second finger segment 21 further has a mounting recess

25 at an upper position of the second finger segment 21 close to the head end 23. The head end 23 of the second finger segment 21 has a through hole 231. The head end 23 of the second finger segment 21 is pivotally connected to the first pivot portion 12 of the first finger segment 11 via the through hole 231, and the first joint portion 13 is relatively accommodated in the head end 23. The tail end 24 has a second pivot portion 26 in the form of a protruding post extending laterally along the Z-axis and a second joint portion 27 in the form of a plate protruding forward along the X-axis. Another toothed rack 28 is provided on the second joint portion 27. The toothed rack 28 is arranged in an arc shape along the Y-axis. A power unit 61 is accommodated in the accommodating space 22. The power unit 61 may consist of a single motor or a combination of a motor and a speed reducer. The power unit 61 has a transmission shaft 62 extending toward the first joint portion 13 and a transmission gear 63 that may be a bevel gear or a hypoid gear connected to the periphery of the transmission shaft 62.

The transmission unit 51 is located in the mounting recess 25 of the second finger segment 21. The transmission unit 51 includes a toothed disc 52 arranged in an inclined manner. The toothed disc 52 has a predetermined number of slanted teeth 521 arranged along its periphery. A drive shaft 53 is provided at the center of the toothed disc 52. The drive shaft 53 extends toward the direction of the toothed rack and rotates synchronously along with the toothed disc 52. A drive gear 54 is provided along the periphery of the drive shaft 53 and meshes with the toothed rack 14. The drive gear 54 may be a bevel gear or a hypoid gear. The number of teeth of the drive gear 54 is less than the number of teeth of the toothed disc 52. An inclination angle θ is defined between the central axis L of the drive shaft 53 and the central axis L' of the transmission shaft 62. In this embodiment, the inclination angle θ is 45 degrees as an example. The transmission unit 51 is arranged obliquely in the mounting recess 25 at the upper position of the second finger segment 21, which can simplify the number of components and the overall weight. The transmission unit 51 can effectively utilize space to reduce the overall volume. Besides, it can provide a sufficiently large reduction ratio in the transmission process. When the transmission gear 63 on the transmission shaft 62 of the power unit 61 drives the toothed disc 52 and the drive shaft 53 to rotate synchronously, the drive gear 54 will be driven to move along the toothed rack 14, so as to steadily drive the second finger segment 21 to be pivoted upward or downward at a predetermined angle along the Y-axis relative to the first finger segment 11. The motor of the power unit 61 may be equipped with an angle sensor for controlling the movement of the finger segment precisely and for simulating the bending and straightening movements of the human finger joints accurately. When the second finger segment 21 is in an extended position A relative to the first finger segment 11, the central axis L" of the transmission shaft 62 of the power unit 61 is aligned with the center line of the toothed rack 14, extending along the X-axis. In addition, if the torque provided by the power unit 61 composed of a motor alone is insufficient, the power unit 61 composed of a speed reducer connected in series to the front end of the motor can be used to perform a first-stage reduction through the speed reducer, and then the transmission unit 51 performs a second-stage reduction to ensure its output torque.

Figure 5:
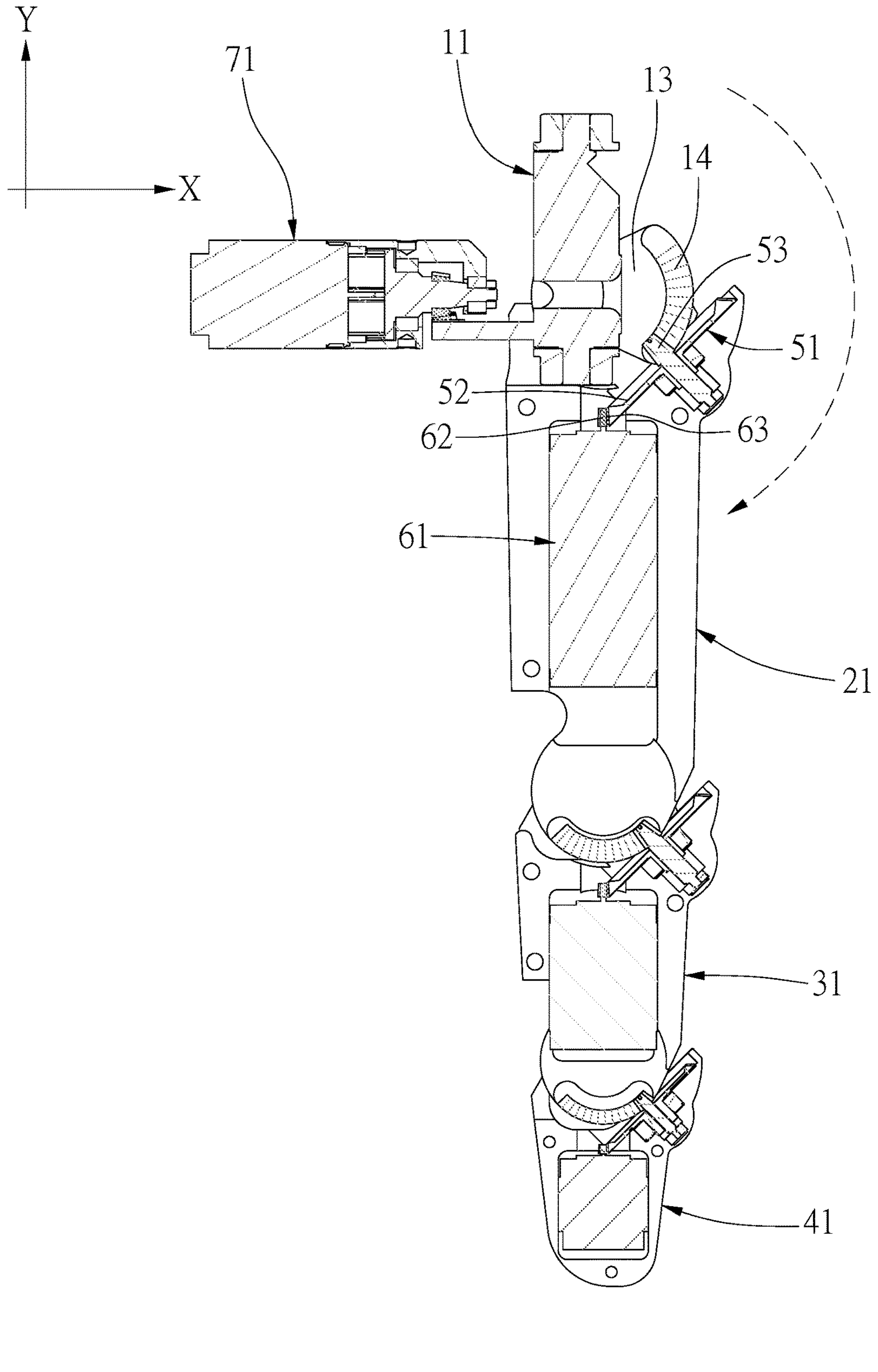
FIG. 5 and FIG. 6 are schematic views of the present invention, illustrating that the finger segments are pivoted downward.
Figure 6:
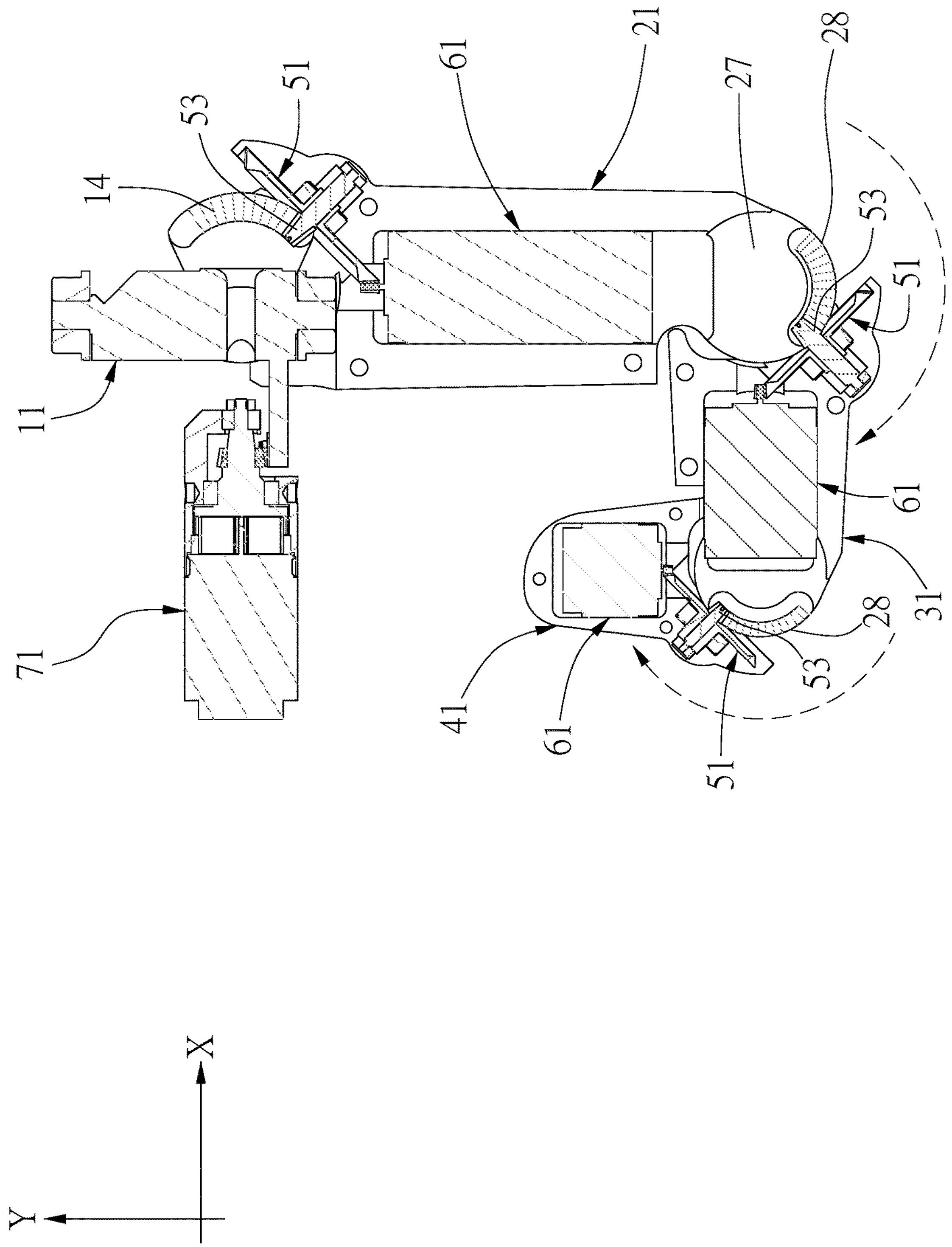

Further, a head end 33 of the third finger segment 31 is pivotally connected to the second pivot portion 26. The third finger segment 31 also has the power unit 61 and the transmission unit 51 as the second finger segment 21. The toothed rack 28, the power unit 61 and the transmission unit 51 are also provided at the joint of the third finger segment 31 and the fourth finger segment 41 as the first finger segment 11 and the second finger segment 21, such that the third finger segment 31 and the fourth finger segment 41 can be moved along the corresponding toothed racks 28 through their respective drive gears 54 for driving the third finger segment 31 and the fourth finger segment 41 to be pivoted upward or downward at a predetermined angle along the Y-axis. Referring to FIG. 5 and FIG. 6, the corresponding finger segments can be driven to bend or straighten by driving the power units 61 of the second finger segment 21, the third finger segment 31 and the fourth finger segment 41 to rotate forward or reversely. Each joint of the finger segments of the present invention can be driven independently, providing high flexibility and precise control.

Figure 7:
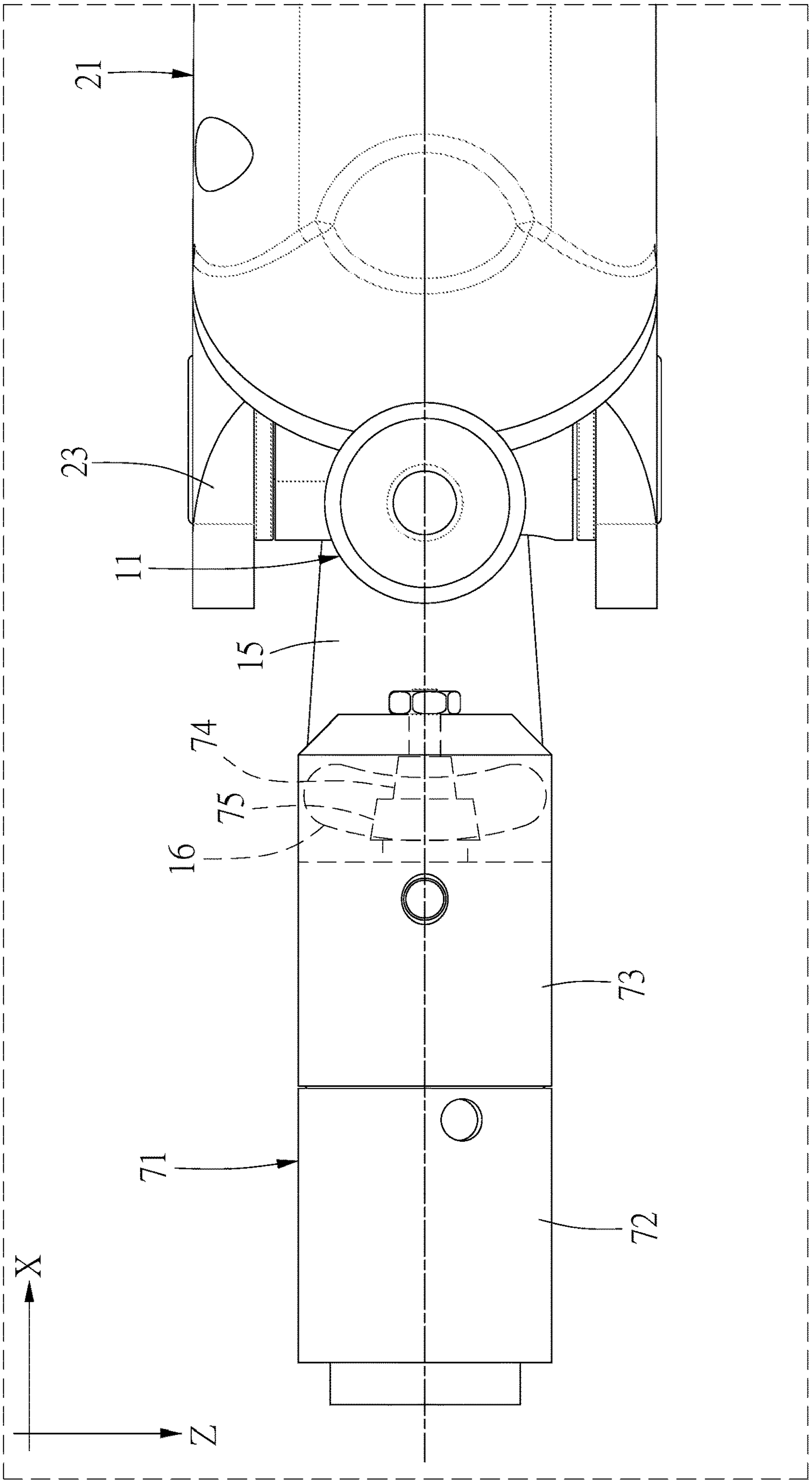
FIG. 7 and FIG. 8 are schematic views of the present invention, illustrating that the first finger segment is tilted sideward relative to the drive unit.
Figure 8:
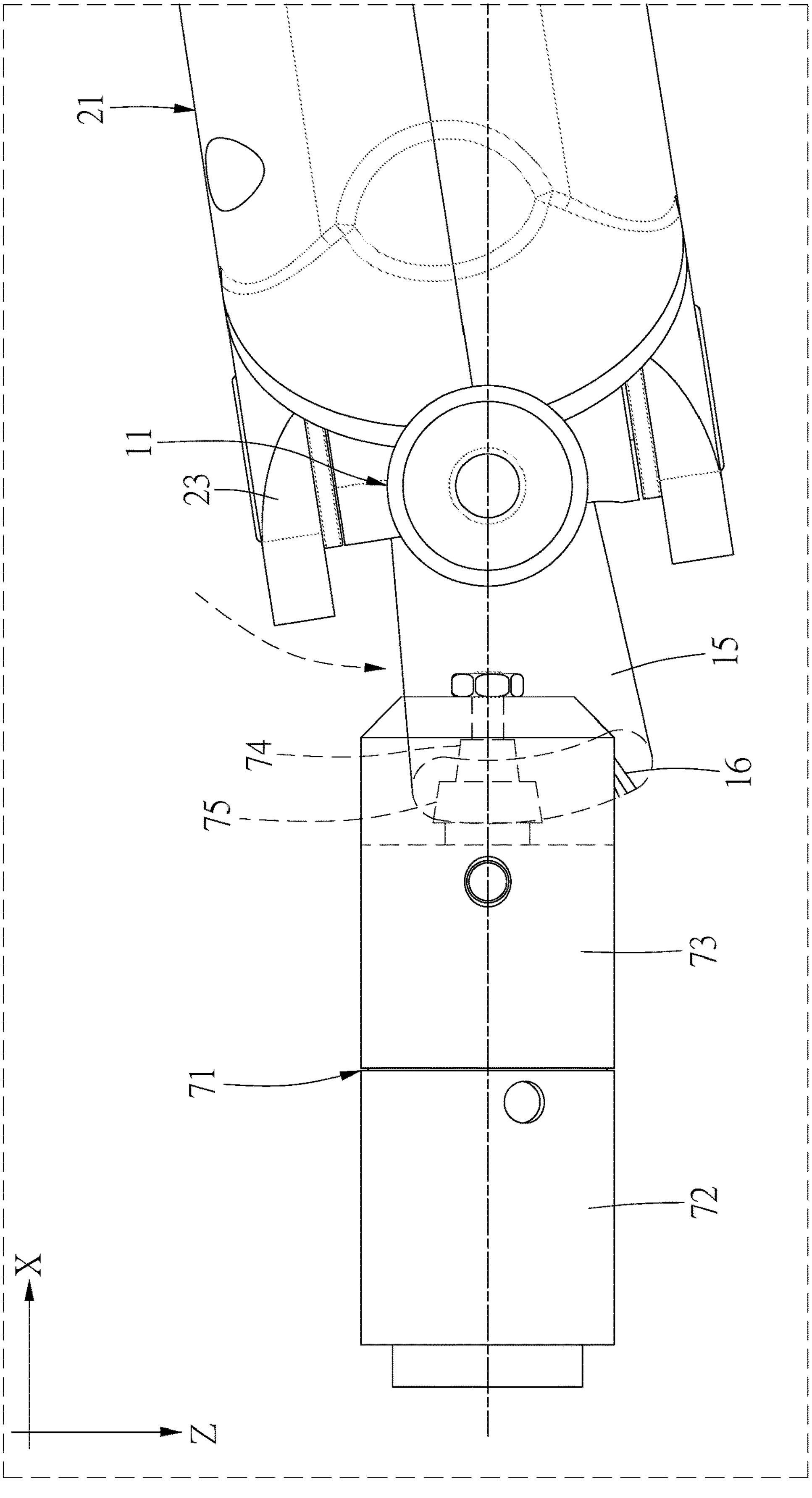

In addition, a support seat 15 is formed on the other end of the first finger segment 11. A drive toothed rack 16 is provided on the support seat 15. The drive toothed rack 16 is arranged in an arc shape along a Z-axis. A drive unit 71 includes a drive motor 72 and a speed reducer 73 connected to the drive motor 72. The speed reducer 73 has an output shaft 74 extending along the X-axis. The output shaft 74 and the transmission shaft 62 have the same central axis L'. An output gear 75 that may be a bevel gear or a hypoid gear is connected to the periphery of the output shaft 74. The output gear 75 meshes with the drive toothed rack 16. When the drive motor 72 drives the output shaft 74 to run via the speed reducer 73, the drive toothed rack 16 will be pushed by the output gear 75, as shown in FIG. 7 and FIG. 8, so that the first finger segment 11 can be driven steadily to tilt leftward or rightward at a predetermined angle along the Z-axis relative to the drive unit 71. Further, the other finger segments can be driven to perform lateral swing, so as to improve the flexibility of movement.

What is claimed is:

1. A finger joint transmission mechanism of an anthropomorphic robot hand, comprising:

a first finger segment, having a first pivot portion and a first joint portion at one end thereof, a toothed rack being provided on the first joint portion, the toothed rack being arranged in an arc shape along a Y-axis;

a second finger segment, being hollow and having an accommodating space therein, the second finger segment having a head end and a tail end opposite to the head end, the head portion of the second finger segment being pivotally connected to the first pivot portion of the first finger segment, the tail end having a second pivot portion and a second joint portion, a power unit being provided in the accommodating space, the power unit including a transmission shaft extending toward the first joint portion and a transmission gear connected to a periphery of the transmission shaft;

a transmission unit, disposed at an upper position of the second finger segment close to the head end, the transmission unit includes a toothed disc meshing with the transmission gear, a drive shaft being provided at a center of the toothed disc, the drive shaft being synchronously rotated along with the toothed disc, a drive gear being provided along a periphery of the drive shaft, the drive gear meshing with the toothed rack;

wherein when the transmission gear on the transmission shaft of the power unit drives the toothed disc and the drive shaft to rotate, the drive gear is synchronously driven to move along the toothed rack, so that the second finger segment is driven to be pivoted upward or downward at a predetermined angle relative to the first finger segment.

2. The finger joint transmission mechanism of the anthropomorphic robot hand as claimed in claim 1, wherein the toothed disc has a predetermined number of slanted teeth arranged along a periphery thereof, and the number of teeth of the drive gear is less than the number of the teeth of the toothed disc.

3. The finger joint transmission mechanism of the anthropomorphic robot hand as claimed in claim 1, wherein the first pivot portion is in the form of a protruding post extending toward two opposing sides of the second finger segment along a Z-axis, the first joint portion is in the form of a plate protruding forward along an X-axis, the head end of the second finger segment has a through hole, the head end of the second finger segment is pivotally connected to the first pivot portion of the first finger segment via the through hole, and the first joint portion is relatively accommodated in the head end.

4. The finger joint transmission mechanism of the anthropomorphic robot hand as claimed in claim 3, wherein when the second finger segment is in an extended position relative to the first finger segment, a central axis of the transmission shaft of the power unit is aligned with a center line of the toothed rack, extending along the X-axis.

5. The finger joint transmission mechanism of the anthropomorphic robot hand as claimed in claim 1, wherein the second finger segment further has a mounting recess at the upper position of the second finger segment close to the head end, and the transmission unit is located in the mounting recess.

6. The finger joint transmission mechanism of the anthropomorphic robot hand as claimed in claim 5, wherein the transmission unit is arranged obliquely in the mounting recess, so that an inclination angle is defined between a central axis of the drive shaft and a central axis of the transmission shaft.

7. The finger joint transmission mechanism of the anthropomorphic robot hand as claimed in claim 1, wherein another toothed rack is provided on the second joint portion, the another toothed rack is arranged in an arc shape along the Y-axis, a head end of a third finger segment is pivotally connected to the second pivot portion, the third finger segment also has the power unit and the transmission unit as the second finger segment, when the drive gear of the third finger segment rotates and moves along the another tooted rack, the third finger segment is driven to be pivoted upward or downward at a predetermined angle relative to the second finger segment.

8. The finger joint transmission mechanism of the anthropomorphic robot hand as claimed in claim 1, wherein a support seat is formed on another end of the first finger segment, a drive toothed rack is provided on the support seat, the drive toothed rack is arranged in an arc shape along a Z-axis, a drive unit includes a drive motor and a speed reducer connected to the drive motor, the speed reducer has an output shaft, an output gear is connected to a periphery of the output shaft, the output gear meshes with the drive toothed rack, when the drive motor drives the output shaft to run via the speed reducer, the drive toothed rack is pushed by the output gear, so that the first finger segment is driven to tilt leftward or rightward at a predetermined angle relative to the drive unit.

* * * * *